US 6,574,756 B1

(12) United States Patent
Walker et al.

(10) Patent No.: US 6,574,756 B1
(45) Date of Patent: Jun. 3, 2003

(54) METHOD AND APPARATUS FOR IDENTIFYING THE START OF A DATA FIELD USING A FAULT TOLERANT SYNC WORD

(75) Inventors: Gary W. Walker, Rochester, MN (US); Richard L. Galbraith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,718

(22) Filed: Aug. 31, 1998

(51) Int. Cl.[7] .................................................. G06F 11/00
(52) U.S. Cl. ........................................ 714/707; 714/701
(58) Field of Search ................................ 714/701, 707; 360/48

(56) References Cited

U.S. PATENT DOCUMENTS

| | | | | |
|---|---|---|---|---|
| 4,335,426 A | * | 6/1982 | Maxwell et al. | |
| 5,040,195 A | * | 8/1991 | Kosaka et al. | 375/114 |
| 5,177,766 A | * | 1/1993 | Holland et al. | |
| 5,243,471 A | * | 9/1993 | Shinn | 360/48 |
| 5,268,798 A | * | 12/1993 | Shinn | 360/48 |
| 5,420,893 A | * | 5/1995 | Ward | 375/368 |
| 5,668,810 A | * | 9/1997 | Cannella, Jr. | 370/392 |
| 6,084,734 A | * | 7/2000 | Southerland et al. | 360/53 |

* cited by examiner

*Primary Examiner*—Phung M. Chung
(74) *Attorney, Agent, or Firm*—Mark A. Hollingsworth

(57) ABSTRACT

A method and apparatus for identifying the start of a data field using a fault tolerant sync word with 16/17 rate coding is enclosed. The invention provides a word sync field that uses a 16/17 byte pattern that is repeated. The format of the word sync allows the proper identification of the start of the data even if only certain portions of the word sync are recovered. An encoded data block includes a sync field for providing proper timing for bit synchronization and a word sync field following the sync field, the word sync field being written with a predetermined phase relative to the sync field to identify a start of a data field. The word sync field comprises N word sync patterns, each word sync pattern comprising two subpatterns, wherein the phase relationship of the word sync field and the sync field enables identification of the start of the data field by identifying any N subpatterns. Each of the N word sync patterns comprises a 17 bit word sync pattern, the 17 bit word sync patterns comprising an 8 of 9 byte and an 8 of 8 byte. The N word sync patterns further comprises three, two or one word sync patterns forming six, four, or two subpatterns respectively, wherein only half of the subpatterns must be detected to identify the start of the data field.

18 Claims, 11 Drawing Sheets

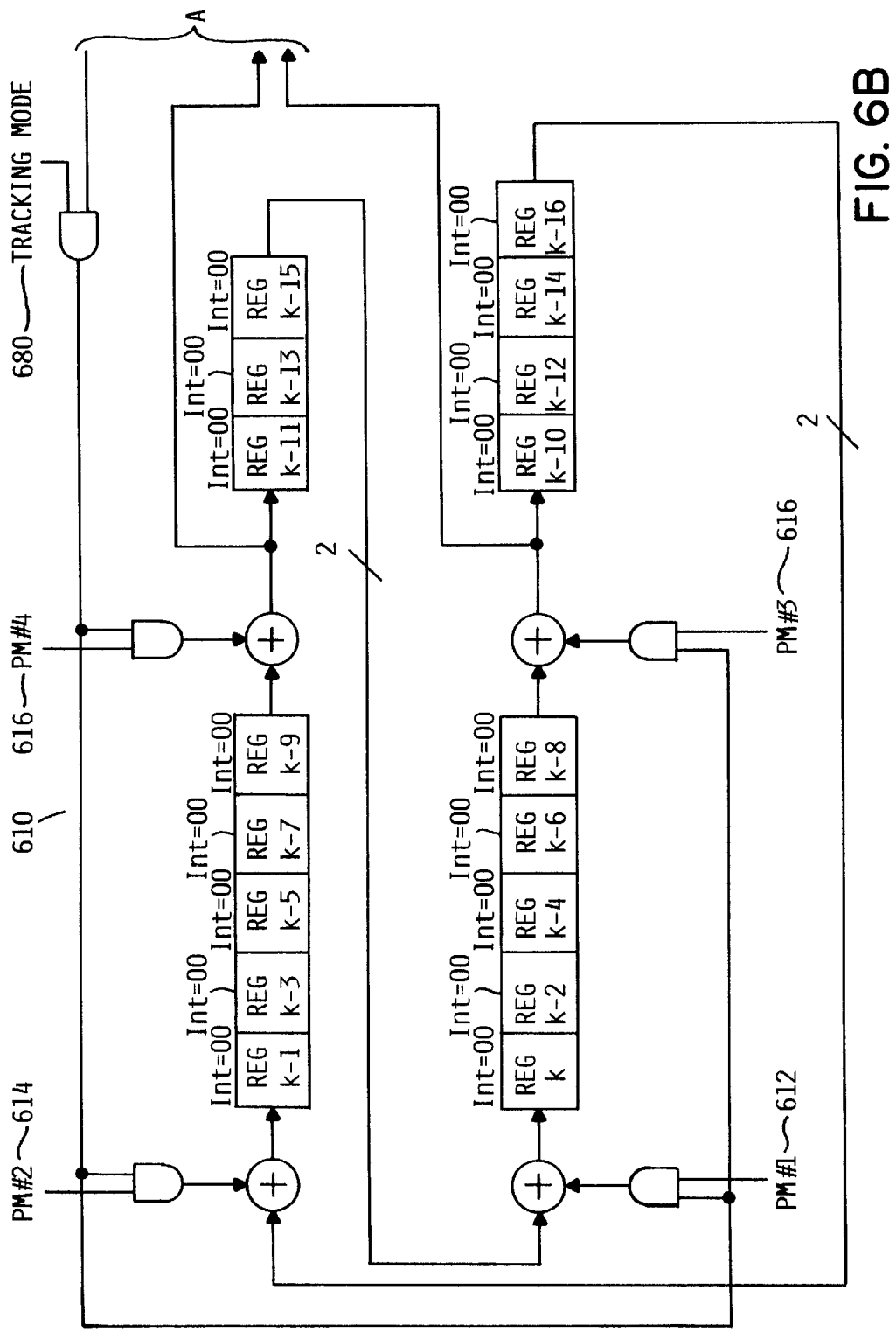

METHOD AND APPARATUS FOR IDENTIFYING THE START OF A DATA FIELD USING A FAULT TOLERANT SYNC WORD

BACKGROUND OF THE INVENTION

1. Field of the Invention

This invention relates in general to data storage devices, and more particularly to a method and apparatus for identifying the start of a data field using a fault tolerant sync word.

2. Description of Related Art

Memory systems, optical or magnetic, have moving recording media on which information is recorded in sections or sectors. These information sections must be accessible so that desired information can be read therefrom. Accessibility is achieved by providing header sections of discrete recordings on the moving media ahead of these information sections, defining fields of bit code patterns, forming synchronizing fields, start of information or word sync fields, together with data address fields, which together contain information for providing timed access to the recorded information or data.

The fields described above include recordings on the media in the form of bits, such as magnetic bits on magnetic media, which are transduced as the media moves past a transducer disposed adjacent the surface of the media. The transducer is optically or magnetically coupled to the recorded bits on the media. The bits on the magnetic media are serially recorded in patterns of transition and non-transition magnetic dibits or optically readable bits. The media surface is usually of one state of polarization, which when read within the clock pulse intervals provides indications which characterize the non-transition bits. Transition bits are oppositely poled from the non-transition bits in the magnetic media and therefore provide different indications.

The header section in the form of bit patterns, may be used for various purposes. Among such purposes is the synchronization and phase locking the servo system and providing read/write controls with respect to the media for reading and writing operations, and to provide an indication useful in identifying a particular location or position on a moving media at which information is to be recorded or read by the transducer. The start of the sync field is part of the header field. The header filed may also include a word sync field for identifying the first bit in the data field.

It is difficult in high density recording to write codes without error. Without defect tolerance in reading such codes, such as a word sync code, it is necessary to spare (skip over) any section or sector that contains a defect in the word sync field. This is wasteful of data space. Also, a partial—response maximum—likelihood (PRML) detection channel is often used to achieve high data density in writing and reading digital data on recording media. However, uncoded binary data is not suitable for PRML data channels because unconstrained customer data may contain long spans of null signal or adjacent zeroes which provide no timing or gain information to the channel and prevent proper timing and gain tracking to the readback signal waveform. Rate 8/9 modulation codes are known for use with PRML detection channels to assure a minimum correction rate for PRML timing and gain control loops. Further, as compared with 8/9 coding, the use of 16/17 rate coding allows customer data to be stored on the disk more efficiently. Only 17 bits need to be stored on the disk for every 16 bits of customer data. However, current word sync fields for identifying the start of a data field do not provide sufficient fault tolerance with 16/17 rate coding.

It can be seen that there is a need for a method and apparatus for identifying the start of a data field using a fault tolerant sync word with 16/17 rate coding.

SUMMARY OF THE INVENTION

To overcome the limitations in the prior art described above, and to overcome other limitations that will become apparent upon reading and understanding the present specification, the present invention discloses a method and apparatus for identifying the start of a data field using a fault tolerant sync word with 16/17 rate coding.

The present invention solves the above-described problems by providing a word sync field that uses a 16/17 byte pattern that is repeated. The format of the word sync allows the proper identification of the start of the data even if only certain portions of the word sync are recovered.

An encoded data block in accordance with the principles of the present invention includes a sync field for providing proper timing for bit synchronization and a word sync field following the sync field, the word sync field being written with a predetermined phase relative to the sync field to identify a start of a data field.

Other embodiments of a system in accordance with the principles of the invention may include alternative or optional additional aspects. One such aspect of the present invention is that the word sync field comprises N word sync patterns, each word sync pattern comprising two subpatterns, wherein the phase relationship of the word sync field and the sync field enables identification of the start of the data field by identifying any N subpatterns.

Another aspect of the present invention is that each of the N word sync patterns comprises a 17 bit word sync pattern, the 17 bit word sync patterns comprising an 8 of 9 byte and an 8 of 8 byte.

Another aspect of the present invention is that the N word sync patterns further comprises three word sync patterns forming six subpatterns, wherein only three of the six subpatterns must be detected to identify the start of the data field.

Another aspect of the present invention is that the N word sync patterns further comprises two word sync patterns forming four subpatterns, wherein only two of the four subpatterns must be detected to identify the start of the data field.

Another aspect of the present invention is that the N word sync patterns further comprises one word sync pattern forming two subpatterns, wherein only one of the two subpatterns must be detected to identify the start of the data field.

Another aspect of the present invention is that the sync field comprises a modulus 2 phase and the word sync comprises a modulus 17 phase.

Another aspect of the present invention is that the word sync field is written without one length magnets.

Another aspect of the present invention is that the data field follows the word sync field.

Another aspect of the present invention is that the word sync field comprises a 16/17 byte pattern, the 16/17 byte pattern further comprising an 8/9 subpattern and an 8/8 subpattern and being repeated N times, wherein the start of the data field is identified when a pattern match for any N of the subpatterns is identified.

Another aspect of the present invention is that a start of data field detector is provided with includes a bit sync detector for providing a modulus 2 phase and a word sync detector, coupled to the bit sync detector, the word sync detector counting the modulus 2 phase and a modulus 17 phase count N derived from a word sync pattern, comparing the modulus 2 phase count to the modulus 17 phase count, detecting when the modulus 2 phase count and the modulus 17 phase count N occur simultaneously, identifying the start of the data field relative to the word sync pattern last incrementing the modulus 17 count.

Another aspect of the present invention is that a start of data field detector is provided that includes a bit sync detector for detecting a sync field and providing a modulus M phase signal in response thereto and a word sync detector, coupled to the bit sync detector, for detecting word sync patterns written with a predetermined phase relative to the sync field, wherein the word sync detector further includes a modulus J phase signal counter for receiving the modulus J phase signal and locking thereto, a register ring, the register ring comprising K registers, one of the K registers being incremented when a pattern match is detected to produce a modulus K signal, a multiplexer, coupled to the register ring and the modulus J phase signal counter, the multiplexer being modulated by the modulus J phase signal for representing the phase of the sync field and a greater than or equal to N comparator, coupled to the multiplexer, wherein N represents a number of times the word sync pattern is repeated, the greater than or equal to N comparator determining when the number of detected pattern matches represented by the modulus K signal is greater than or equal to N and identifying the start of the data field relative to the word sync pattern last incrementing a register.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a word sync that is fault tolerant and which includes embedded error correction features. The word sync tolerates defects and errors, while still finding the start of the data correctly. The word sync according to the present invention is written using a pattern of 16/17 byte pattern that is repeated. The format of the word sync allows the proper identification of the start of the data even if only certain portions of the word sync are recovered. For example, if the 17 byte pattern is written three times, only three out of the six pieces of that pattern need to be recovered correctly to identify the start of the data.

Figure 1:
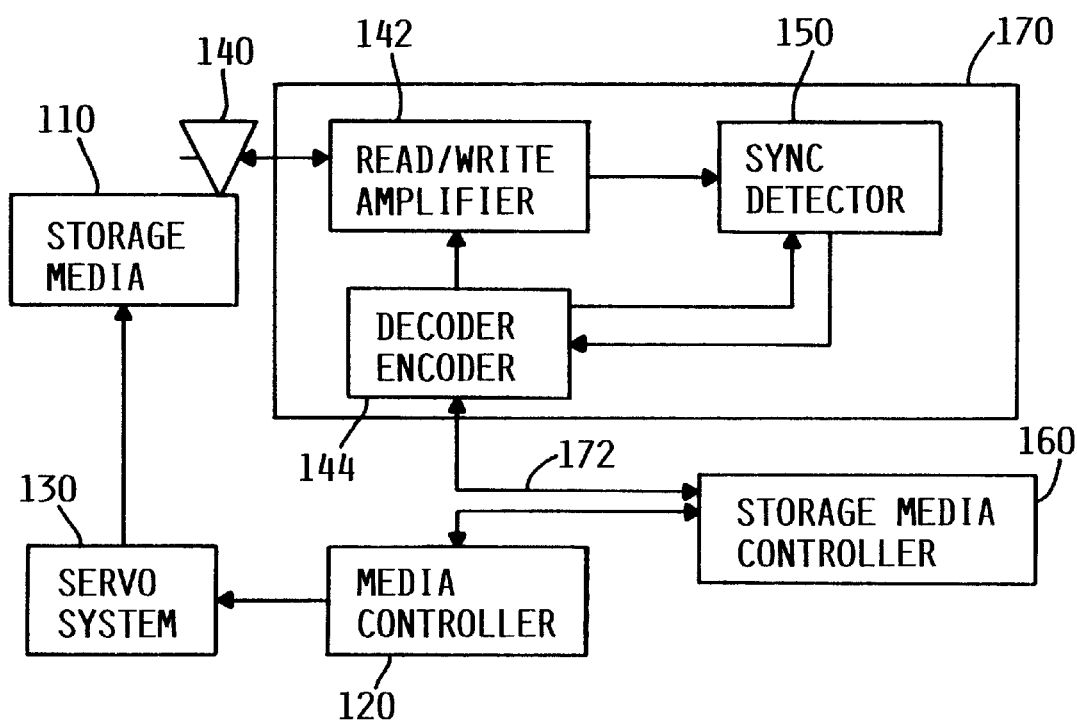
FIG. 1 illustrates a storage device according to the present invention.

FIG. 1 illustrates a storage device 100 according to the present invention. FIG. 1 shows storage media 110 being controlled by a media controller 120 through a servo system 130. A transducer 140 reads and writes data on the storage media 110. Read/write signals are processed by read/write amplifiers 142 and the decoder 144, e.g. a Verterbi decoder. Read signals are processed by a sync detector 150 which detects a sync field and a word sync field according to the present invention. The sync detector includes a bit sync detector and a word sync detection circuit as described in more detail herein below. In addition, in response to control signals and data provided by a storage media controller 160, the sync detector 150 provides a sync field and a word sync according to the present invention to an encoder 144 for framing the data written to the storage media 110 as described herein below.

As shown in FIG. 1, at the input of the channel 170, a data signal 172 is received for writing to the recording media 110. In order to read back the data, the sync field must first be written to the storage media 110. The sync field is a repeating pattern which allows the gain and timing to be synchronized to properly frame the data. Thus, the sync field is used to acquire the proper gain and to acquire the proper timing to the data stream as the data stream is being read back from the recording medium.

The sync field may vary, but generally includes about 20 bytes of data. After, the sync field is written, a word sync is written. The sync field achieves bit synchronization so that the signal is sampled at the proper time instance so that every bit time the correct bits are being read, whereas the word sync uniquely identifies the starting position of the data.

Figure 2:
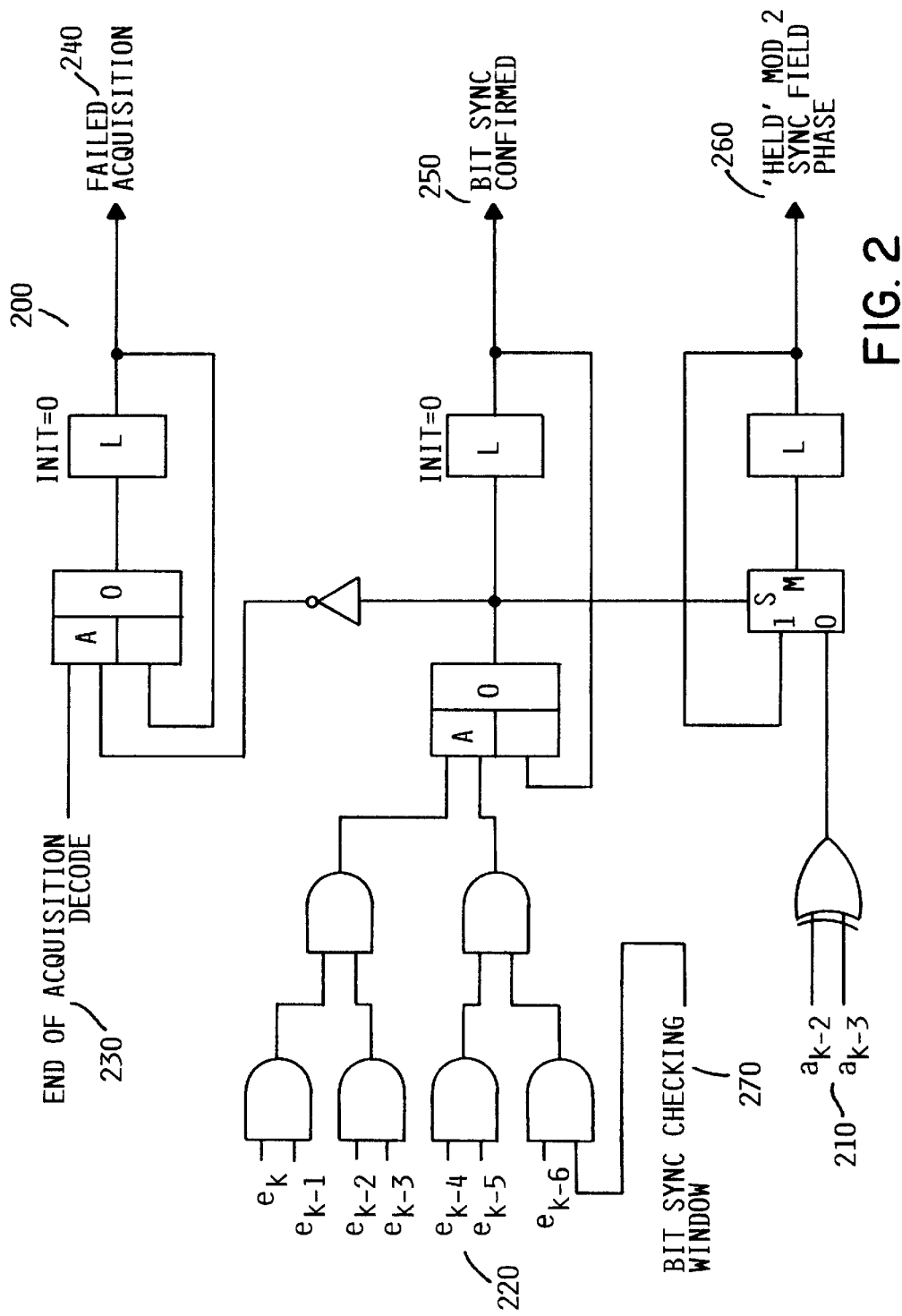
FIG. 2 illustrates a bit sync detector according to the present invention for detecting the bit sync.

FIG. 2 illustrates a bit sync detector 200 according to the present invention for detecting the bit sync. The circuit 200 checks to ensure that bit sync is maintained. The data is examined to determine if it looks like the bits are properly locked up.

The bit sync detector 200 uses non-postcoded Viterbi outputs 210, $a_k$, and postcoded Viterbi outputs 220, $e_k$. The bit sync detector receives an End of Acquisition Decode signal 230 from the storage media controller for indicating the end of the acquisition period. The Failed Acquisition signal 240 generated by the bit sync detector 200 is used to verify proper read operation of the channel. When bit synchronization is detected, the bit sync detector 200 provides a bit sync confirmed signal 250. The modulus 2 sync field phase signal 260 indicates that the bit sync detector is locked to the sync field. The bit sync checking window 270 controls the window for bit sync detection.

Accordingly, the bit sync detector 200 increases the fault tolerance of word sync detection. For example, very high duty cycle read operations can result in permanent failure without a read failure condition. If the read VCO is pushed far off from it's correct voltage, than the read 360 PD is never invoked to pull the read VCO back because of read recovery timer. In the acquisition loop, this will not occur.

Data recovery procedures may handle sync byte time-out, i.e., failed acquisition, versus ECC on the fly not correctable, i.e., garbage data, versus sector overrun much differently. Miscorrection and passing of bad data to the customer is much more likely without a read failure condition. Further, more intelligent thermal asperity recovery is possible if a bit sync failure is known.

The word sync provides information regarding where the framing boundaries for the bytes of data located on the storage medium. Thus, the word sync identifies the exact starting bit of the data. Once the starting point of the data is identified, the data itself includes error correction code that allows recovery of detected errors. However, if the start of the data is not identified properly, the error correction code is useless.

Accordingly, the word sync must be fault tolerant and must include embedded error correction features also. The word sync needs to be able to tolerate defects and errors, and still find the start of the data correctly. Accordingly, the word sync according to the present invention is written using a pattern of 16/17 byte pattern that is repeated. The format of the word sync allows the proper identification of the start of the data even if only certain portions of the word sync are recovered. For example, if the 17 byte pattern is written three times, only three out of the six pieces of that pattern need to be recovered correctly to identify the start of the data.

Figure 3:
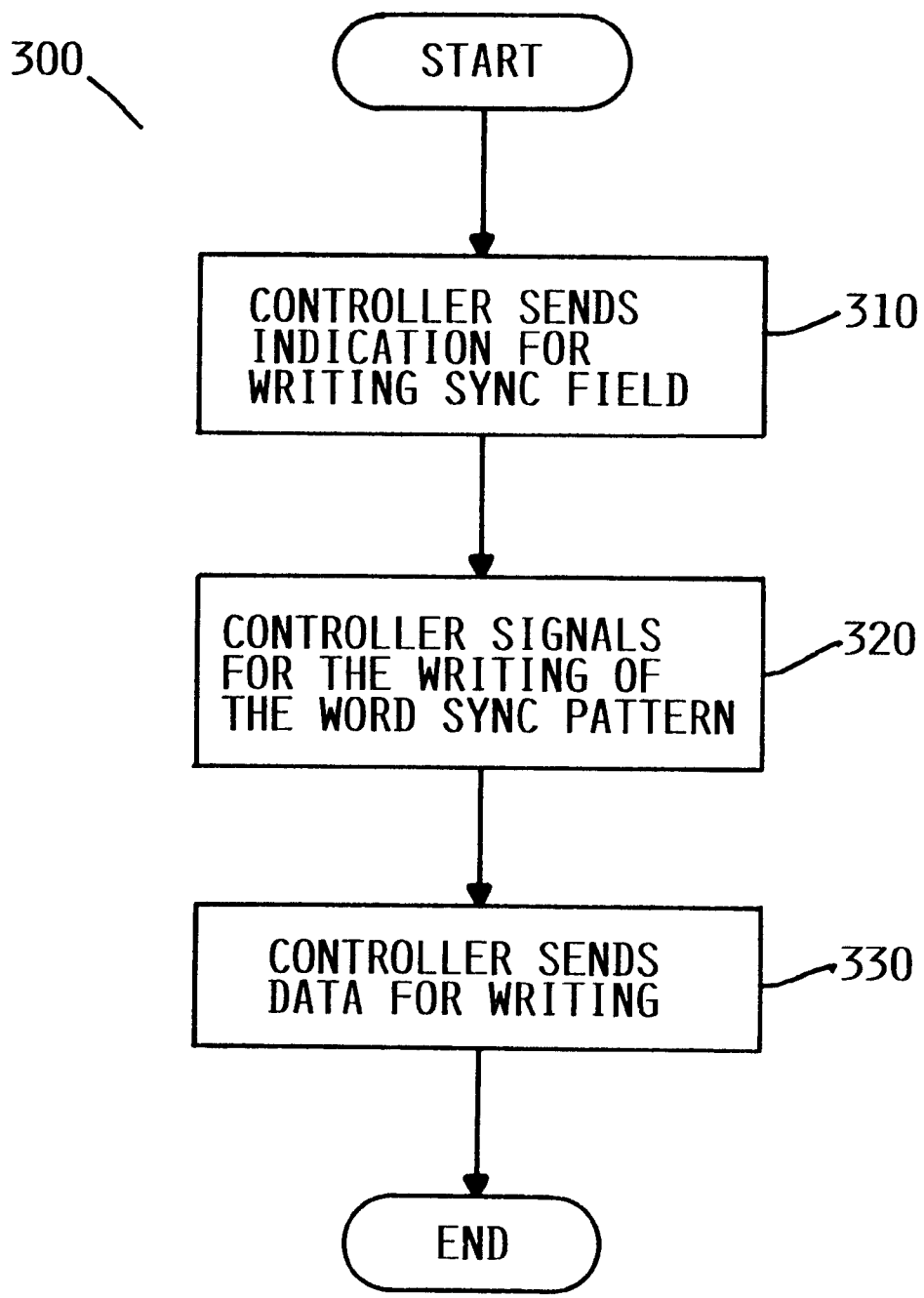
FIG. 3 illustrates a flow chart for writing data to the storage media according to the present invention.

FIG. 3 illustrates a flow chart 300 for writing data to the storage media according to the present invention. The disk controller sends the data to write out to the recording medium and provides instructions regarding how long a sync field is to be written. The disk controller first sends an indication for writing the sync filed 310. Then the disk controller signals that the word sync fields are to be written 320. The disk controller then sends the data 330. Thus, control lines or extra wiring for providing control is not necessary. For example, the disk controller may send all ones to indicate the initiation of the writing of the sync field. At some point after the all one pattern, a single byte of zeroes is sent that indicates that the word sync should be written to the recording medium. The data follows immediately after the byte of zeroes.

Those skilled in the art will recognize that the invention is not meant to be limited to the above described protocol, but that any signal protocol indicating the start of the sync field, the start of the word sync and the start of the data could be utilized. Further, while hardware lines could be used to control the writing of the sync field, the word sync and the data, a signaling protocol is more efficient.

Magnetically, when this pattern is written to the disk, the process of writing the pattern involves the changing of the write current that is going through the recording head. Every bit time, the write current may be changed. For example, during one bit time the write process may change from a north magnet to a south magnet on the disk and then the very next bit time the current could be switched back again. Such a process would result in a one length magnet where the write current is changed in two consecutive bit times. This is the shortest magnet that may be written. Further, a one length magnet is stressful on the recording process because it increases the chances or errors and consequently may result in an increase in readback errors. Thus, to maximize the fault tolerance of the word sync pattern, the writing of the one length magnet pattern should be avoided.

Figure 4:
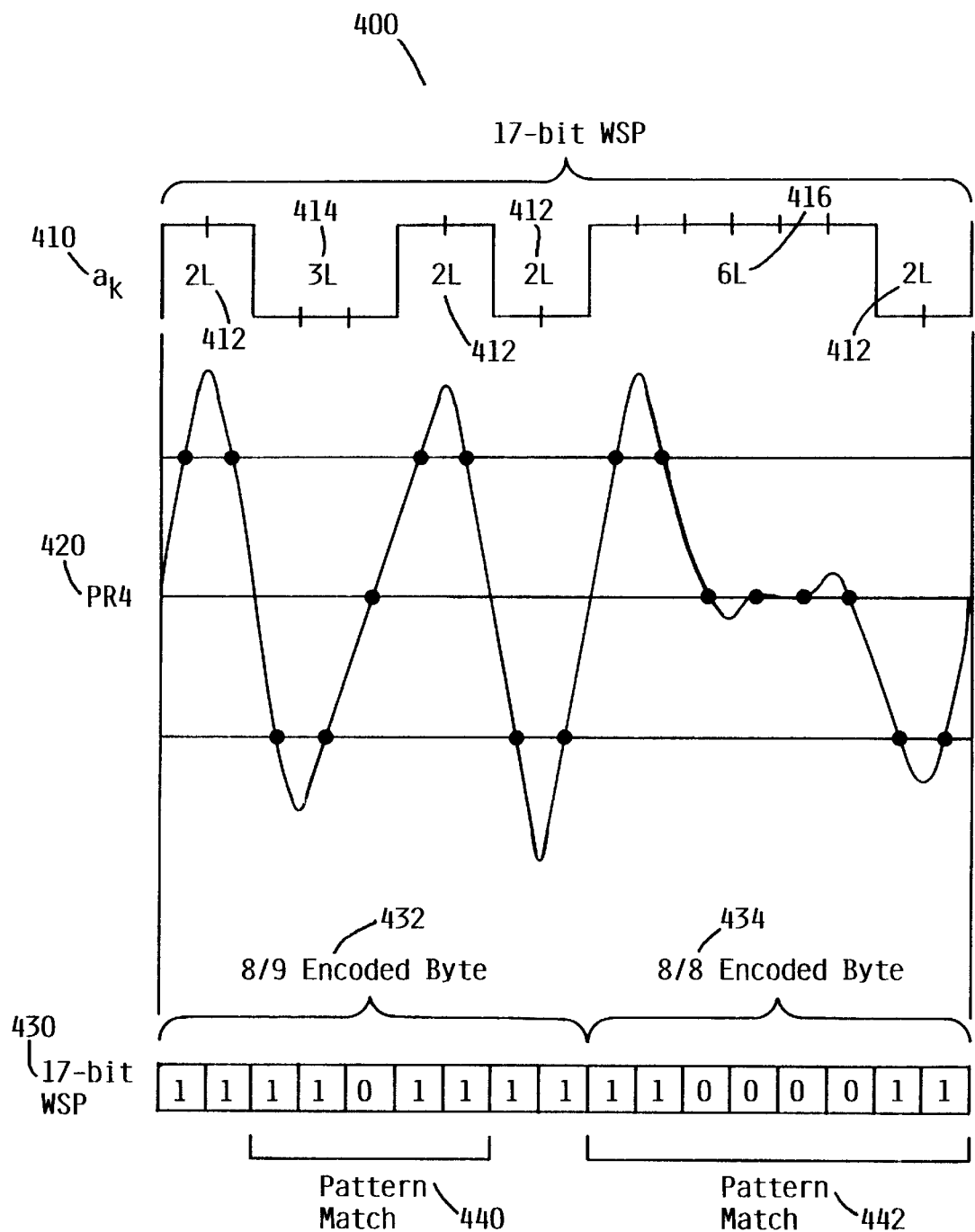
FIG. 4 illustrates a 17 bit word sync pattern according to the present invention.

FIG. 4 illustrates a 17 bit word sync pattern 400 according to the present invention. First, the write current 410 that is going through the recording head is illustrated. As can be seen in FIG. 4, the write current 410 includes two 412, three 414 and six 416 length magnets. Thus, there are no one length magnets in the write current 410. Next, the read signal 420 is shown. The read signal 420 is the signal being read from the recording medium after first being written using the word sync according to the present invention. Below the read signal is the word sync pattern 430. The work sync pattern 430 includes two bytes: an 8/9 byte 432 and an 8/8 byte 434. Below the 17 bit word sync pattern are two brackets 440, 442 indicating pattern matches.

Figure 5A:
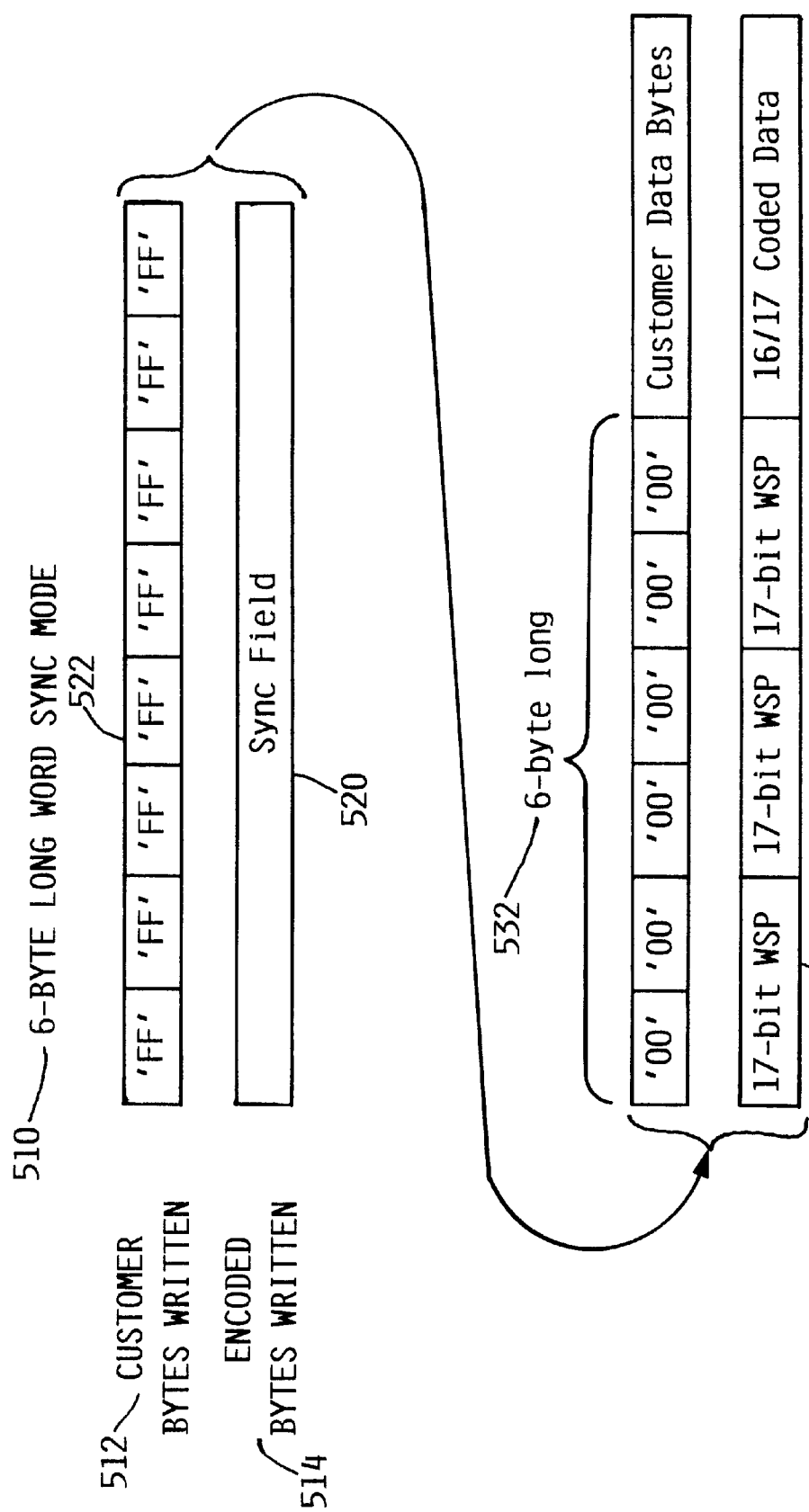
FIGS. 5a–c illustrate different word sync lengths according to the present invention.
Figure 5B:
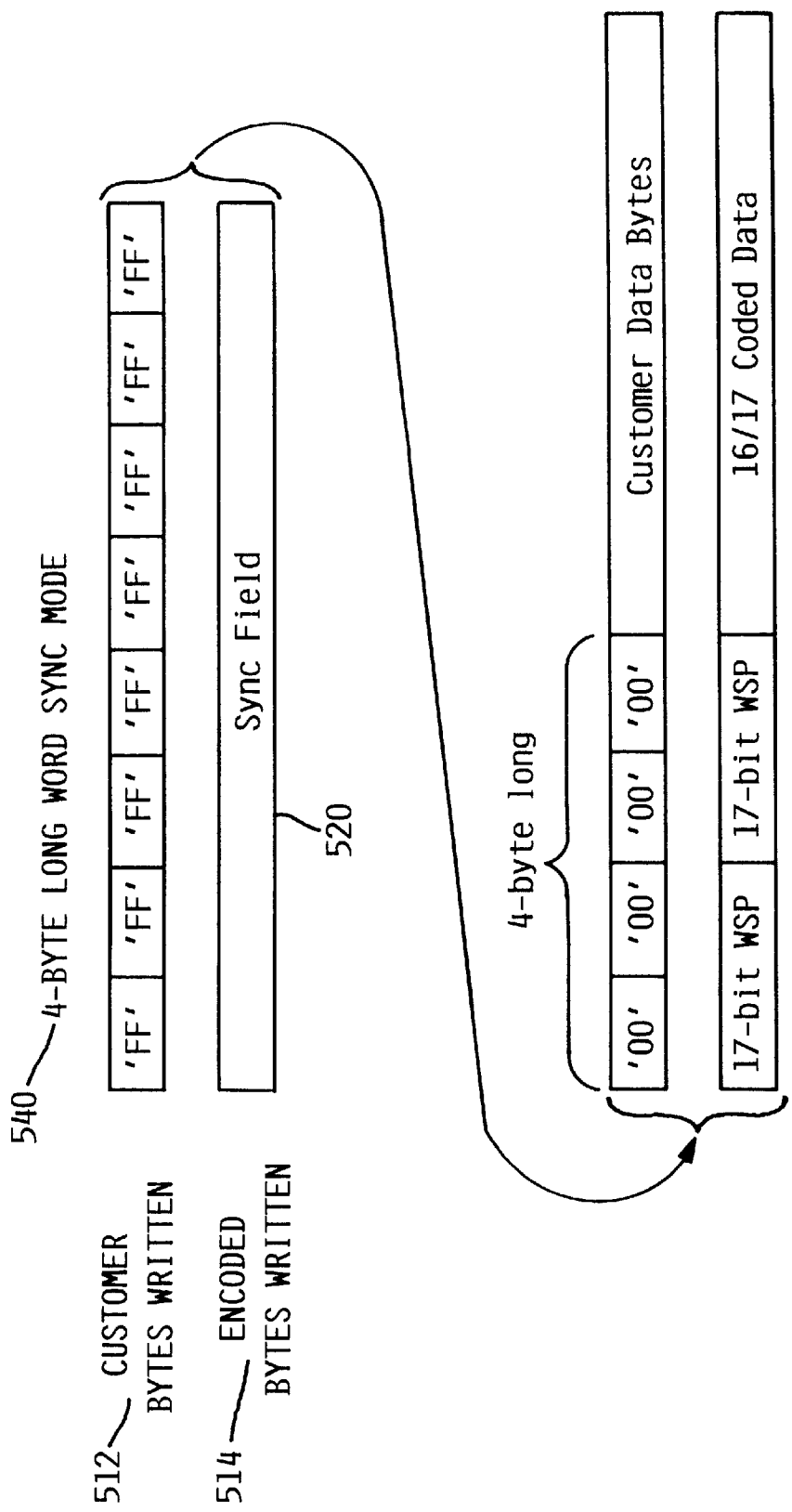
Figure 5C:
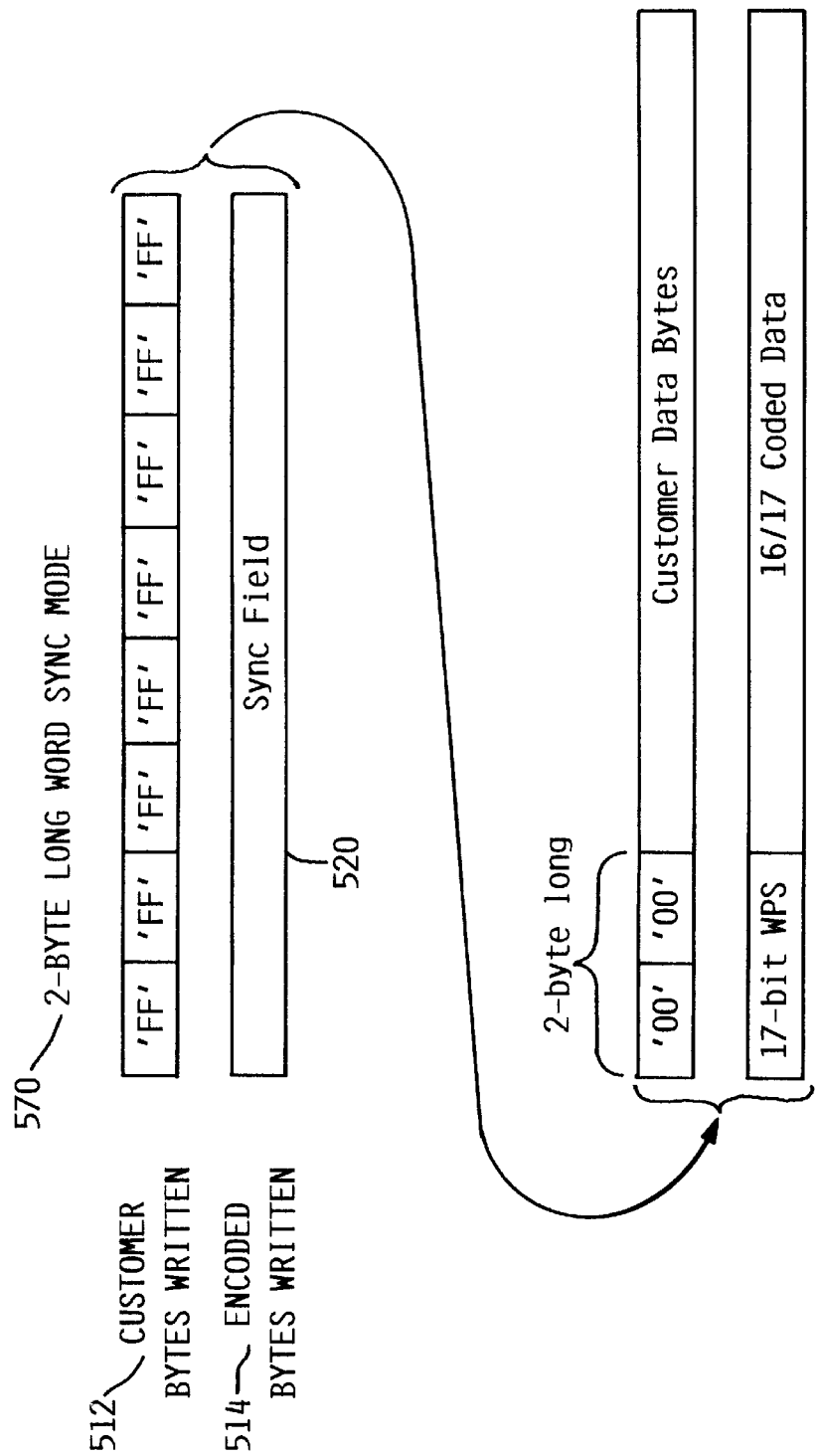
Figure 6A:
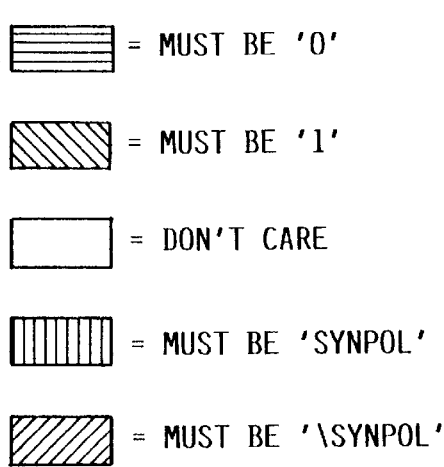
FIG. 6 illustrates the word sync detection circuit according to the present invention.
Figure 6A:
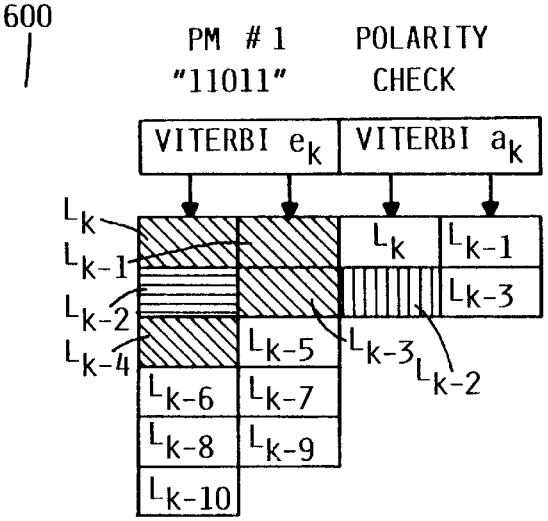
Figure 6A:
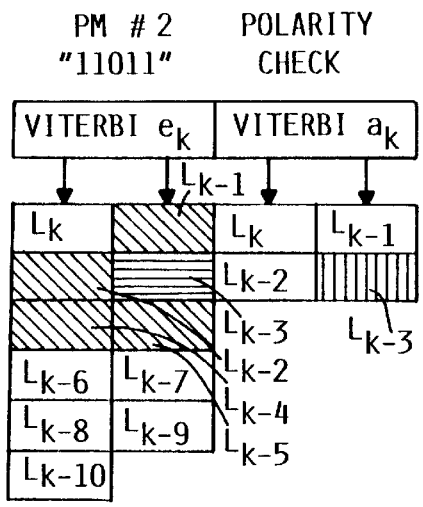
Figure 6A:
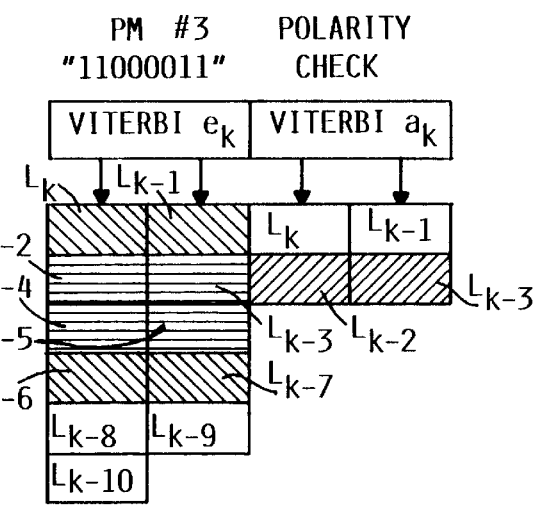
Figure 6A:
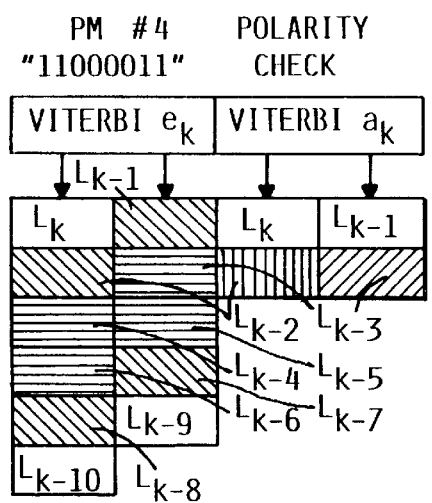
Figure 6C:
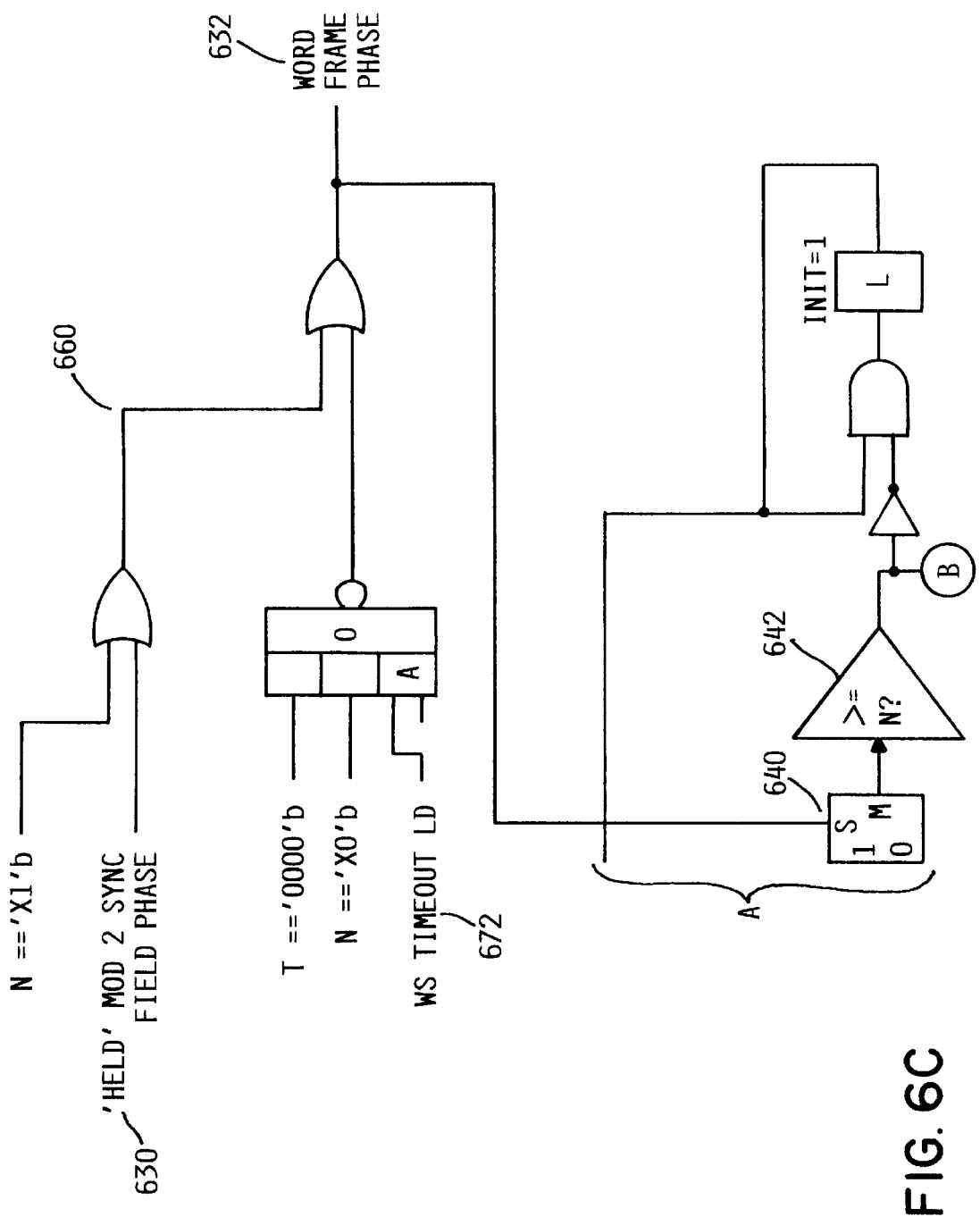
Figure 6D:
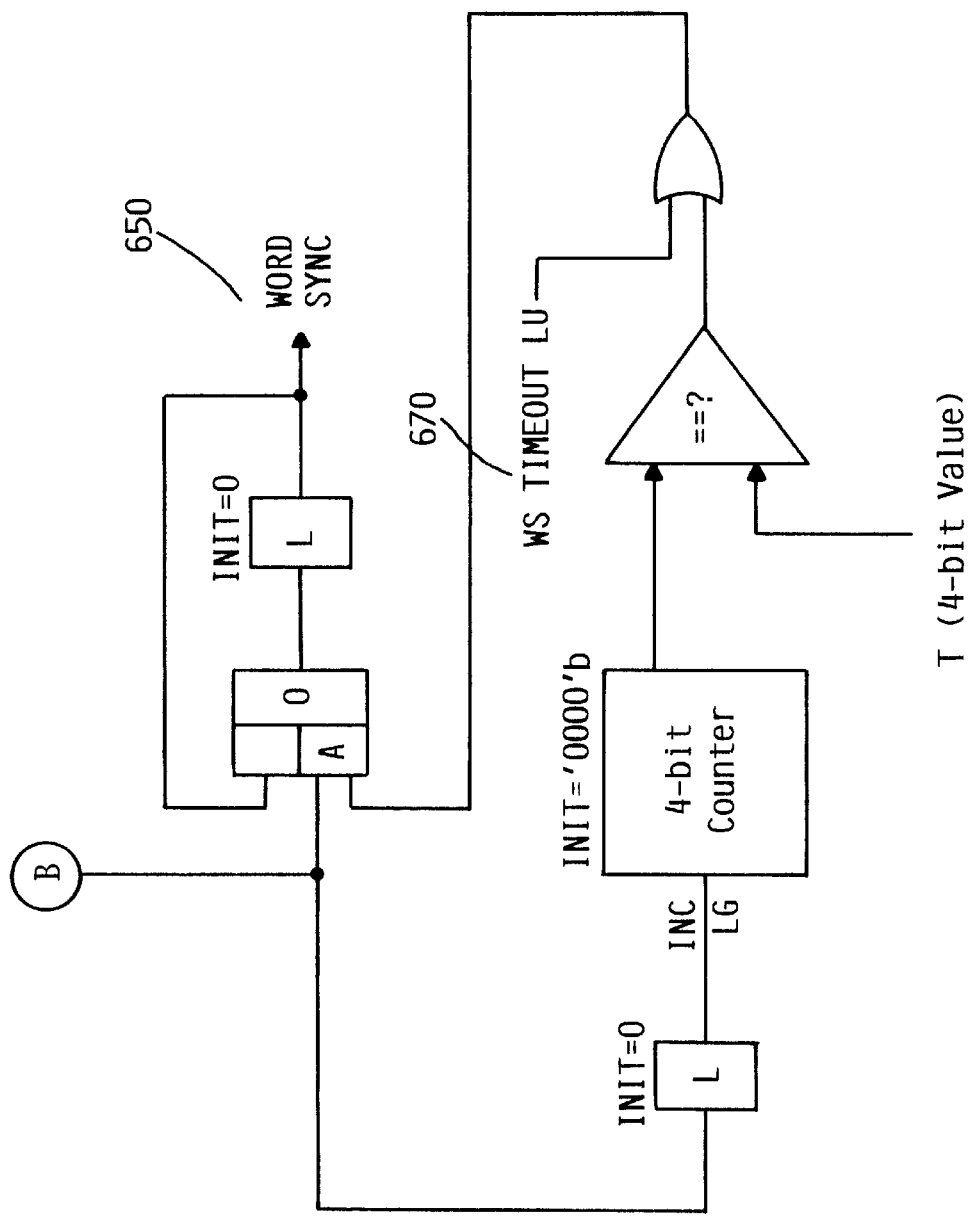

FIGS. 5a–c illustrate different word sync lengths 510, 540, 570 according to the present invention. Customer bytes 512 are provided and then the encoded bytes 514 are written. As shown in FIG. 5, the word sync may include different lengths, e.g. six 510, four 540 and two 570 word sync lengths. For example, the 6 byte long word sync mode 510 shows the sync field 520 being written when the FF pattern 522 is being provided by the customer and the 17 bit word sync pattern 530 being written when the 6 byte long 00 pattern 532 is being written by the customer. The 16/17 coded data 540 is written when the customer data 542 is provided.

FIG. 6 illustrates the word sync detection circuit 600 according to the present invention. Referring back to the two brackets 440, 442 indicating pattern matches in FIG. 4, the sequence of bits that are in the brackets is the sequence that are the word sync detection circuit looks for. When the 17 bit word sync pattern is written, two patterns are produced, i.e., one corresponding to each bracket in FIG. 4. If three word sync patterns are written in a row, i.e., six total bytes, then six of those pattern would be formed. However, the word sync detection circuit 600 needs to identify only any three of the six patterns. Thus, defects and errors may corrupt any three of the six without preventing the identification of the start of the data.

For example, referring to FIG. 5a, if the first three patterns of the word sync pattern 530 were defective, and the second three patterns are detected, the start of the data could be identified without knowing which of the three patterns were detected. This is because the word sync pattern 530 is written in a very specific phase with respect to the phase of the sync field 520. The sync field 520, which comes before the word sync 530, is a sine wave that repeats every four bit times. Thus, the sync field 520 constitutes a modulus 2 phase. Consequently, if a modulus 2 counter is used to identify which one of four phases the sync field 520 relates to the recovered word sync patterns 530. A modulus 2 count and a modulus 17 count are identified, and those two counts end up in phase with respect to each other only every 8 bytes in time.

Accordingly, the registers 610 in FIG. 6 form a 17 bit circular ring. Each of these registers 610 in the ring has two bits of memory in it, so it's two latches for each of these registers 610. At the start, all of the registers 610 have 0's in them and every time a pattern match is found the phase is identified. There are four potential pattern matches that can be found, which are labeled PM 1 612, PM 2 614, PM 3 616 and PM 4 618. Thus, each of the pattern matches correspond to the phase associated therewith.

Every time a pattern match is found, the number at that point in the ring is incremented by 1. So the 17 bit ring is circulating and every time a pattern match is found it increments one of the 17 registers 610 in the ring. When one of the registers in the ring is incremented to a value of 3, three valid pattern matches have been found—all within the same modulus 17 phase. At this point, the 17 bit ring constitutes the modulus 17 count.

When both the modulus 2 phase signal 630 coming in at the top and the modulus 17 phase of the ring are both high at the same time, the word frame phase output 632 would be high. For example, at the output of the ring there is multiplexer 640 and it goes into a greater than or equal to N comparator 642. The N is the programmable number of pattern matches that are required. N either equal to 1, 2 or 3. So if a 6 byte long pattern is being used, then N would be three. When N is three, any three of the six pattern matches must be identified. The multiplexer 640 for the comparator 642 is modulated by this modulus 2 sync field phase, which causes it to toggle indicating the proper phase of the sync field. When the multiplexer 640 is in the right state and the ring is outputting a value of greater than N at the same time, the word sync latch 650 goes high and stays high.

So in principal, the word sync detection circuit relies on the comparison of two counters, wherein one is a modulus 2 counter 660 and the other is a modulus 17 counter, i.e., the register ring 610. When the modulus 2 counter 660 is locked up to the sync field and the modulus 17 counter, i.e., the register ring 610, matches the modulus 2 counter 660, the start of data is uniquely identified. In other words, the modulus 2 counter 660 outputs a high output every other clock cycle and the modulus 17 counter 610 outputs a high value once every 17 clock cycles. The greater than or equal to N comparator 642 makes sure that the minimal number of required pattern matches are found, which indicates that only one of the 17 registers 610 in the ring counter will have three or more pattern matches in it.

The word sync timeout lock up 670 indicates that word sync did not occur within a predetermined time period and that further searching is to be terminated. The word sync timeout lock down 672 is held low because of a timeout. The word sync detection circuit includes an acquisition mode and a tracking mode, which is selected by the tracking mode signal 680. Acquisition mode refers to the mode of acquiring the initial sync field. Once the gain and timing are acquired, then the circuit may lock to the sync field pattern. Then, tracking mode is entered. The search for word sync does not begin until the circuit is in the tracking mode.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An encoded data block, comprising:
    a sync field for providing proper timing for bit synchronization; and
    a word sync field following the sync field, the word sync field being written with a predetermined phase relative to the sync field to identify a start of a data field.

2. The encoded data block of claim 1 wherein the word sync field comprises N word sync patterns, each word sync pattern comprising two subpatterns, wherein the phase relationship of the word sync field and the sync field enables identification of the start of the data field by identifying any N subpatterns.

3. The encoded data block of claim 2 wherein each of the N word sync patterns comprises a 17 bit word sync pattern, the 17 bit word sync patterns comprising an 8 of 9 byte and an 8 of 8 byte.

4. The encoded data block of claim 2 wherein the N word sync patterns further comprises three word sync patterns forming six subpatterns, wherein only three of the six subpatterns must be detected to identify the start of the data field.

5. The encoded data block of claim 2 wherein the N word sync patterns further comprises two word sync patterns forming four subpatterns, wherein only two of the four subpatterns must be detected to identify the start of the data field.

6. The encoded data block of claim 2 wherein the N word sync patterns further comprises one word sync pattern forming two subpatterns, wherein only one of the two subpatterns must be detected to identify the start of the data field.

7. The encoded data block of claim 1 wherein the sync field comprises a modulus 2 phase and the word sync comprises a modulus 17 phase.

8. The encoded data block of claim 1 wherein the word sync field is written without one length magnets.

9. The encoded data block of claim 1 wherein the data field follows the word sync field.

10. The encoded data block of claim 1 wherein the word sync field comprises a 16/17 byte pattern, the 16/17 byte pattern further comprising an 8/9 subpattern and an 8/8 subpattern and being repeated N times, wherein the start of the data field is identified when a pattern match for any N of the subpatterns is identified.

11. A method for identifying a start of a data field, comprising:
    receiving an indication from a storage media controller indicating the writing of a sync field is to be initiated;
    initiating the writing of the sync field, the sync field providing proper timing for bit synchronization;
    receiving an indication from the storage media controller indicating the writing of a word sync field is to be initiated;
    initiating the writing of the word sync field, the word sync field being written with a predetermined phase relative to the sync field to identify a start of a data field;
    receiving data for writing to the storage media; and
    encoding the data and writing the data after the word sync field.

12. The method of claim 11 wherein the sync field writing indication comprises a plurality of bytes of all 1s.

13. The method of claim 12 wherein the word sync field writing indication comprises M bytes of all 0s.

14. The method of claim 13 wherein the word sync field comprises N word sync patterns, wherein N is equal to M/2 and each word sync pattern comprises two subpatterns, wherein the method further comprises detecting N subpatterns to identify the start of the data field.

15. The method of claim 14 wherein each of the N word sync patterns comprises a 17 bit word sync pattern, the 17 bit word sync patterns comprising an 8 of 9 byte and an 8 of 8 byte.

16. The method of claim 14 wherein the N word sync patterns further comprises three word sync patterns forming six subpatterns, wherein only three of the six subpatterns must be detected to identify the start of the data field.

17. The method of claim 14 wherein the N word sync patterns further comprises two word sync patterns forming four subpatterns, wherein only two of the four subpatterns must be detected to identify the start of the data field.

18. The method of claim 14 wherein the N word sync patterns further comprises one word sync pattern forming two subpatterns, wherein only one of the two subpatterns must be detected to identify the start of the data field.

* * * * *